United States Patent
Kim et al.

(10) Patent No.: US 9,729,090 B2
(45) Date of Patent: Aug. 8, 2017

(54) BRUSHLESS DIRECT CURRENT MOTOR AND CLEANER USING THE SAME

(71) Applicant: Samsung Electronics Co., Ltd., Suwon-si (KR)

(72) Inventors: Kwang Soo Kim, Seoul (KR); Deok Jin Kim, Hwaseong-si (KR); Young Kwan Kim, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 172 days.

(21) Appl. No.: 14/595,382

(22) Filed: Jan. 13, 2015

(65) Prior Publication Data
US 2015/0214802 A1 Jul. 30, 2015

(30) Foreign Application Priority Data
Jan. 28, 2014 (KR) .......... 10-2014-0010861

(51) Int. Cl.
| | |
|---|---|
| H02K 3/28 | (2006.01) |
| H02P 6/08 | (2016.01) |
| H02K 21/16 | (2006.01) |
| H02K 29/00 | (2006.01) |
| H02P 6/00 | (2016.01) |
| H02P 6/26 | (2016.01) |
| H02K 7/20 | (2006.01) |
| H02P 5/46 | (2006.01) |

(52) U.S. Cl.
CPC .............. *H02P 6/08* (2013.01); *H02K 21/16* (2013.01); *H02K 29/00* (2013.01); *H02P 6/005* (2013.01); *H02P 6/085* (2013.01); *H02P 6/26* (2016.02); *H02K 2213/06* (2013.01)

(58) Field of Classification Search
CPC . A47L 9/00; H02K 21/16; H02K 3/28; H02K 17/06; H02K 17/14; H02K 19/12; H02K 19/32; H02K 29/00; H02P 6/00
See application file for complete search history.

(56) References Cited

U.S. PATENT DOCUMENTS

| | | | | |
|---|---|---|---|---|
| 4,567,407 A | * | 1/1986 | Ecklin | ..................... H02P 25/30 310/113 |
| 4,982,123 A | * | 1/1991 | Raad | ..................... H02K 19/38 290/46 |
| 5,710,493 A | * | 1/1998 | Flynn | ..................... H02P 6/14 318/400.2 |

(Continued)

FOREIGN PATENT DOCUMENTS

| | | |
|---|---|---|
| EP | 1508955 | 2/2005 |
| JP | 2005-253280 | 9/2005 |

(Continued)

OTHER PUBLICATIONS

Extended European Search Report dated Nov. 20, 2015 in European Patent Application No. 15151995.6.

*Primary Examiner* — Bentsu Ro
*Assistant Examiner* — Said Bouziane
(74) *Attorney, Agent, or Firm* — Staas & Halsey LLP

(57) ABSTRACT

A cleaner includes a BLDC motor and a power unit. The BLDC motor includes a rotor and a stator provided with a DC coil and an AC coil in a separate manner. The power unit is configured to supply DC power and AC power to the DC coil and the AC coil, respectively.

18 Claims, 13 Drawing Sheets

(56) References Cited

U.S. PATENT DOCUMENTS

| | | | | |
|---|---|---|---|---|
| 6,906,479 B2* | 6/2005 | Xu | ............ | F02C 7/268 |
| | | | | 290/8 |
| 7,268,522 B1* | 9/2007 | Baker | ............ | H02K 19/26 |
| | | | | 290/31 |
| 2006/0273681 A1* | 12/2006 | Durham | ............ | H02K 29/03 |
| | | | | 310/180 |
| 2007/0046124 A1* | 3/2007 | Aydin | ............ | H02K 21/24 |
| | | | | 310/156.37 |
| 2012/0206083 A1* | 8/2012 | Higashikawa | ............ | H02P 25/20 |
| | | | | 318/808 |
| 2013/0257188 A1* | 10/2013 | Raminosoa | ............ | H02K 19/24 |
| | | | | 310/46 |
| 2014/0152228 A1* | 6/2014 | Flynn | ............ | H02P 23/00 |
| | | | | 318/504 |
| 2015/0102606 A1* | 4/2015 | Shah | ............ | H02K 19/24 |
| | | | | 290/1 A |
| 2015/0265121 A1* | 9/2015 | Kim | ............ | H02K 21/16 |
| | | | | 15/319 |

FOREIGN PATENT DOCUMENTS

| | | |
|---|---|---|
| JP | 2009-60772 | 3/2009 |
| JP | 4615063 | 1/2011 |
| JP | 4662316 | 3/2011 |
| JP | 2012-60781 | 3/2012 |
| JP | 2012-105390 | 5/2012 |
| KR | 10-2001-0076142 | 8/2001 |
| KR | 10-2009-0086654 | 8/2009 |
| KR | 10-2011-0006016 | 1/2011 |
| KR | 10-2011-0100463 | 9/2011 |
| KR | 10-2013-0076183 | 7/2013 |

\* cited by examiner

BRUSHLESS DIRECT CURRENT MOTOR AND CLEANER USING THE SAME

CROSS-REFERENCE TO RELATED APPLICATIONS

This application claims the priority benefit of Korean Patent Application No. 10-2014-0010861, filed on Jan. 28, 2014 in the Korean Intellectual Property Office, the disclosure of which is incorporated herein by reference.

BACKGROUND

1. Field

The following description relates to a Brushless Direct Current (BLDC) motor using Direct Current (DC) power and Alternating Current (AC) power, and a corded or a cordless cleaner including the same.

2. Description of the Related Art

A motor is a machine configured to obtain torque from electrical energy, and is provided with a stator and a rotor. The rotor and the stator are configured to have an electromagnetic interaction with each other so that the motor is rotated by a force between a magnetic field and an electric current flowing through a coil.

A universal motor is mainly used as a driving motor for a conventional cleaner. The universal motor has an advantage of low cost because expensive components are not used and a controller is not needed. However, the universal motor needs a commutator and a brush, thereby reducing the efficiency of the motor and having a limited lifespan. In addition, although a hybrid motor that can operate on both DC and AC power, it is difficult for the universal motor to have the same suction force when DC power is applied and when AC power is applied due to lack of a space for inside coils.

Therefore, research on a cleaner Brushless Direct Current (BLDC) motor having high energy density and improved structural strength has been actively conducted.

Generally, the BLDC motor uses an inverter circuit that consists of a switching element instead of a brush and a commutator. Therefore, there is no need of replacing the brush, and there is small amount of electromagnetic interchange and noise.

The BLDC motor is widely applied to products, such as, a cleaner, a refrigerator, an air conditioner compressor, a washing machine, and the like, which require a high efficiency and variable speed.

In addition, to realize the same suction force when DC power is applied and when AC power is applied, the BLDC motor that can operate on both DC and AC power may use a DC motor and an AC motor. Alternatively, by using a boost circuit, DC voltage is increased to the same level of AC voltage or if using a buck circuit, AC voltage is decreased to the same level of DC voltage.

SUMMARY

Additional aspects and/or advantages will be set forth in part in the description which follows and, in part, will be apparent from the description, or may be learned by practice of the invention.

Therefore, it is an aspect of the present disclosure to provide a BLDC motor providing the same driving force when DC power is applied and when AC power is applied because a DC coil and AC coil are provided separately in a stator, and a cleaner including the same.

In accordance with an aspect of the present disclosure, a cleaner includes a BLDC motor provided with a rotor and a stator provided with a DC coil and an AC coil in a separate manner, and a power unit configured to supply DC power and AC power to the DC coil and the AC coil.

The cleaner may include an inverter configured to control the drive of the BLDC motor by converting the DC power and the AC power of the power unit to DC pulse.

A single inverter and a plurality of inverters may perform DC operation and AC operation.

A DC power unit of the cleaner may include a battery, and an AC power unit may supply external power to the cleaner.

The BLDC motor may include a shaft, a rotor connected to the shaft and provided with a permanent magnet, and a stator provided with a DC coil and an AC coil, separately.

The DC coil and the AC coil may be alternately provided on a plurality of teeth of the stator.

The stator may further include a guide unit configured to induce another tooth provided with the DC coil or the AC coil, which is adjacent to a tooth, to have polarity opposite to that of the tooth which is magnetized by power, when power is applied to the DC coil or the AC coil. The guide unit may be connected to the plurality of teeth.

The cross-sectional area of the DC coil may be larger than the cross-sectional area of the AC coil, the number of windings of the DC coil and the AC coil may be inverse to the voltage applied to the DC coil and the AC coil, and the direction of the windings of the DC coil may be opposite to the direction of the windings of the AC coil.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
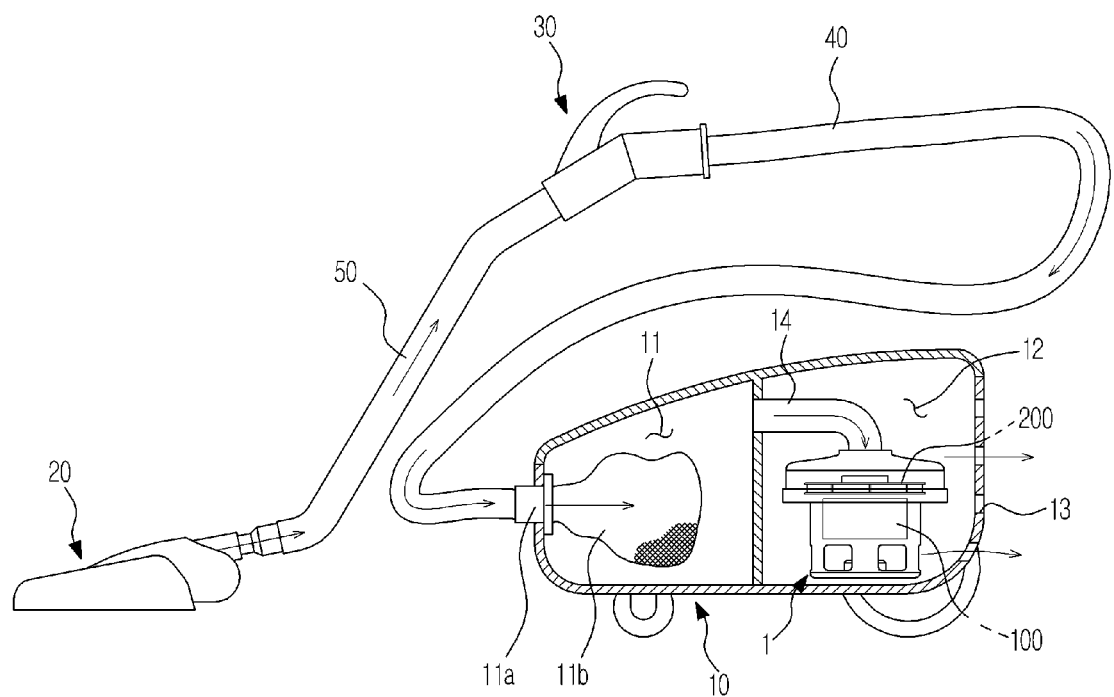
FIG. 1 is a perspective view illustrating a cleaner including a BLDC motor in accordance with an embodiment of the present disclosure.

Reference will now be made in detail to embodiments of the present disclosure, examples of which are illustrated in the accompanying drawings. However, as for the description of the present disclosure, if it is determined that detailed descriptions make embodiments of the present disclosure unclear, the detailed descriptions may be omitted.

Terms used in the description below are defined on the basis of functions on the embodiments. The meaning of the terms may be variable depending on users, the intention and the convention of the operator, and the like. The meaning of the terms follows the definition when the meaning of the terms is defined specifically, otherwise the meaning of the terms follow the definition which is generally recognized by ordinary technicians.

Although the described embodiments and the configuration of the embodiments are described as a single integrated configuration in the drawings, the configuration may be separated or otherwise modified.

A BLDC motor, described as below, is a single-phase BLDC motor, but is not limited hereto.

Hereinafter, an embodiment of a cleaner including a BLDC motor will be described in FIG. 1

FIG. 1 is a view illustrating an external appearance of a cleaner including a BLDC motor.

The cleaner may include a body 10 forming an external appearance of the cleaner, a brush head 20 to contact with a surface where cleaning occurs, a handle 30, and a connecting hose 40 connecting the body 10 to the handle 30.

The brush head 20 is a first part of the cleaner to suction air which includes dust by contacting the surface where the cleaning occurs. At a lower surface of the brush head 20, a brush may be provided to remove dust from the surface where the cleaning occurs.

In addition, the brush head 20 may be formed in a shape of a cube in a predetermined length. Alternatively, the brush head 20 may have various shapes to suction dust by making contact with the surface where the cleaning occurs.

The handle 30 may be formed in a shape which allows a user to easily adjust a connection tube 50 and the brush head 20. At the handle 30, a manipulating unit provided with a plurality of buttons may be provided to select an operation of the cleaner.

The connecting hose 40 may allow an area where the cleaning occurs to be changed by moving the brush head 20 and the connection tube 50 within a certain area without moving the body 10.

The connection hose 40 may be made of elastic material, such as plastic and rubber, for example, to facilitate cleaning of a wide area. Alternatively, the connecting hose 40 may be made of various materials to facilitate cleaning of a wide area.

A dust collecting chamber 11 where dust is collected, and a driving compartment 12 configured to generate suction force may be provided inside of the body 10.

The dust collecting chamber 11 may include an intake port 11a and a dust bin 11b. The intake port 11a may guide the air which includes dust so that the air which includes dust is suctioned to the inside of the body 10. The dust bin 11b may provide a space in which dust contained in the air introduced through the connecting hose 40 is collected.

At the outside of the intake port 11a, the connecting hose 40 may be connected and at the inside of the intake port 11a, the dust bin 11b may be connected.

The driving compartment 12 may include a motor device 1 including a motor 100 and a fan 200, and a discharge port 13.

The motor 100 may generate and supply driving force to the fan 200. The fan 200 may generate suction force by receiving the driving force from the motor 100. The discharging port 13 may be provided on a portion of the driving compartment 12, and may provide a space so that air in which the dust is removed is discharged to the outside.

As for the flow of the air in terms of the entire configuration of the cleaner, the air may be suctioned to the brush head 20 by the fan 200 configured to generate the suction force, and may be introduced to the body 100 through the connecting hose 40. The air may be introduced to a pipe 14 which is connected to the driving compartment 12 after being passed through the intake port 11b connected to the connecting hose 40, and may be discharged to the outside of the cleaner through the discharging port 13.

Hereinafter, a configuration of the BLDC motor in accordance with an embodiment of the present disclosure will be described with reference to FIG. 2.

Figure 2:
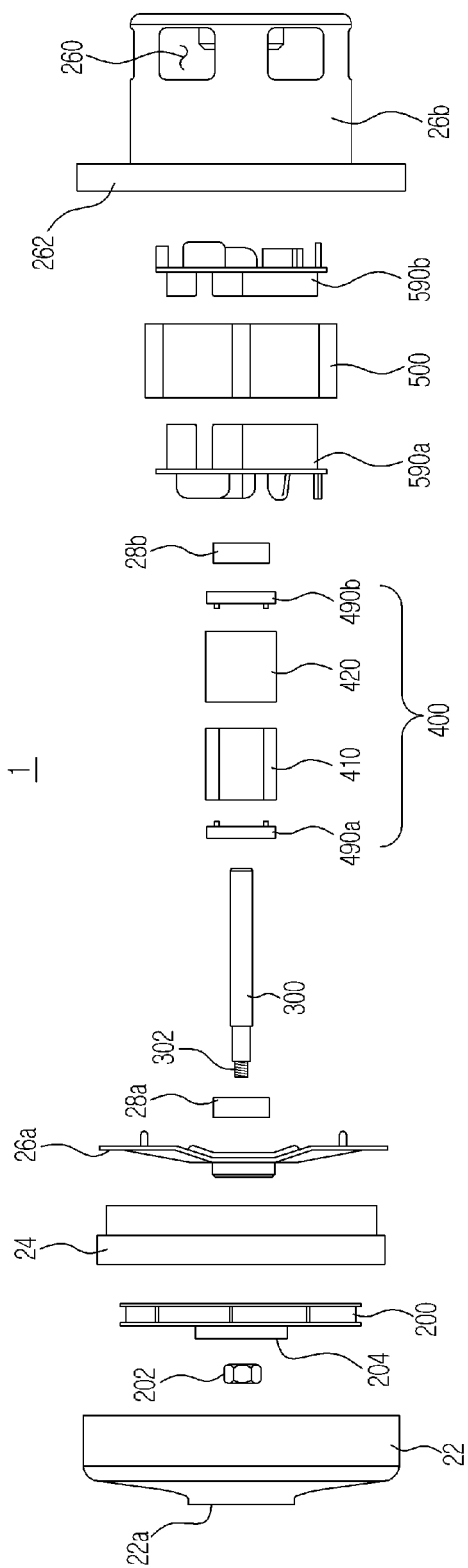
FIG. 2 is an exploded view illustrating the BLDC motor in accordance with an embodiment of the present disclosure.

FIG. 2 is an exploded view illustrating the BLDC motor in accordance with an embodiment of the present disclosure.

The motor device 1 may be provided in the driving compartment 13 of the cleaner. A motor cover 22 may be disposed on the uppermost surface of the motor device 1 and a second housing 26b may be disposed on the lowermost surface of the motor device 1.

In particular, the motor device 1 may include the motor cover 22, a nut 202, the fan 200, a diffuser 24, a first housing 26a, a bearing 28 (illustrated as bearings 28a and 28b), a shaft 300, a rotor 400, a stator 500, an insulator 590 (illustrated as insulators 590a and 590b), and the second housing 26b.

The motor cover 22 may protect the fan 200, the motor 100, and other components from the outside by covering the fan 200. The motor cover 22 may be in the shape of a circular lid to cover the fan 200. At the center of the motor cover 22, a hole 22a may be provided, and air may be introduced to the inside of the motor device 1 through the hole 22a disposed in the center of the motor cover 22.

The nut 202 is a device configured to connect the fan 200 to the shaft 300. At the fan 200, a through-hole 204 penetrating through the center of the fan 200 may be provided so that the shaft 300 passes through. The nut 202 may be coupled to an end portion 302 of the shaft 300 passing through the through-hole 204 of the fan 200 so that a fixation force may be provided to connect the fan 200 to the shaft 300. Therefore, the fan 200 may be rotated at a high speed, and the shaft 300 may be closely connected by the fixation force through the nut 202.

The fan 200 may generate a flow of air by suctioning the air from the hole 22a of the cover 22. The fan 200 applied to the cleaner may be formed in a shape having a wide lower portion thereof and a narrow upper portion thereof. Alternatively, the fan 200 may have various structures to introduce the air to the inside of the body by suctioning air from the outside of the motor device.

The diffuser 24 may guide the air by properly adjusting the flow of the air generated by the fan 200 to attain target flow performance. The diffuser 24 may be also be referred to as a fan guide.

The first housing 26a may be configured to be a supporting part of the bearing 28 and a settling part of the diffuser 24. A side surface of the first housing 26a is connected to the second housing 26b to protect the rotor 400 and the stator 500.

The first housing 26a may be formed in a shape of a circle or a ribbon. Alternatively, the first housing 26a may be formed in various shapes to support the bearing 28 and the diffuser 24.

The bearing 28 may fix the rotor 400 which is connected to the shaft 300 to a predetermined position. The bearing 28 may be disposed on both end portions of the rotor 400. In particular, the bearing 28 may be divided into a first bearing 28a disposed between the rotor 400 and the first housing 26a, and a second bearing 28b disposed between the rotor 400 and the second housing 26b.

The shaft 300 may be installed to be rotatable and may deliver a driving force from the rotor 400 to the fan 200. The shaft 300 may be formed in a shape of a rod to pass through the center of the motor device 1. An end portion of the shaft 300 may be connected to the fan 200. The shaft 300 may be connected to the rotor 400, and the bearing 28 may be disposed on both end portions of the rotor 400, and thereby guiding the shaft 300 and the rotor 400 so that the shaft 300 and the rotor 400 may be properly rotated.

The rotor 400 may include a balance structure 490 (illustrated as balance structures 490a and 490b) used to maintain a balance in the rotor 400, a rotor core 410 in which the shaft 300 is inserted, and a permanent magnet 420 configured to supply magnetic force.

The rotor 400 may be formed in a shape of a cylinder. At the inside of the rotor 400, a path may be provided at the center of the rotor 400 so that the shaft 300 passes through. Alternatively, the rotor 400 may have various structures to supply torque of the motor 100 to the shaft 300.

The balance structure 490 may reduce an unbalance which may be generated during a rotation, by being coupled to the rotor core 410. In particular, a mechanical working of the balance structure 490 is relatively easy, and a mechanical working of the rotor 400 is relatively difficult. Therefore, the balance structure 490 is fixed to the rotor 400 so that the balance of the rotor 400 may be maintained. The balance structure 490 may be divided into a first balance 490a and a second balance 490b, and may be adhered to both ends of the rotor 400, respectively.

A hole (not shown) in which the shaft 300 passes through may be provided at the center of the rotor core 410, and thereby the rotor core 410 is connected to the shaft 300. The permanent magnet 420 may be coupled to a side surface of the rotor core 410

The permanent magnet 420 may be provided on the side surface of the rotor core 410 in a plurality of pairs of a north pole and a south pole. In particular, the permanent magnet 420 may be disposed on the side surface of the rotor core 410 in a way of making the pairs the north pole and the south pole in which a first permanent magnet 420a and a third first permanent magnet 420c are the north pole, and a second permanent magnet 420b and a fourth permanent magnet 420d are the south pole. Alternatively, the number and a shape of the permanent magnet 420 may be variable so that electromagnetic force which is applied to the stator 500, repulsive force, and gravitation are efficiently activated.

The permanent magnet 420 may be formed of ferrite. Ferrite is referred to as iron or iron alloys with a body centered cubic crystal structure. However, ferrite conventionally may be referred to as ferrimagnetic ceramic materials used in magnetic applications. Alternatively, the permanent magnet 420 may be formed of various materials so that repulsive force and gravitation are activated between a magnetic field of the permanent magnet 420 and magnetic field forming coils 520 and 530 of the stator 500 when current is applied.

The stator 500 may include teeth 511 forming a structure of the stator 500, a slot 513, and coils 520 and 530 windings around the teeth 511. The stator 500 may include an accommodating space 540 in which the rotor 400 is accommodated.

The insulator 590 may be formed of an insulating material. The insulator 590 may be disposed on the upper portion and the lower portion of the stator 500. The insulator 590 may be divided into a first insulator 590a disposed on the upper portion of the stator 500 and a second 590b disposed on the lower portion of the stator 500.

At the second housing 26b, a component connected to the shaft 300 such as the rotor 400 and the stator 500 may be placed.

In particular, the second housing 26b may be formed in a shape of a hat having a side surface thereof widely open, which forms an opening unit 262 and the other side surface thereof closed. The opening unit 262 may be connected to the first housing 26a to protect components placed the inside. At the second housing 26b, a plurality of openings 260 may be formed to provide a space in which the air passing through the motor device 1 is discharged through the opening unit 262.

Hereinafter, a rotor in accordance with an embodiment of the present disclosure will be described with reference to FIGS. 3 and 4.

Figure 3:
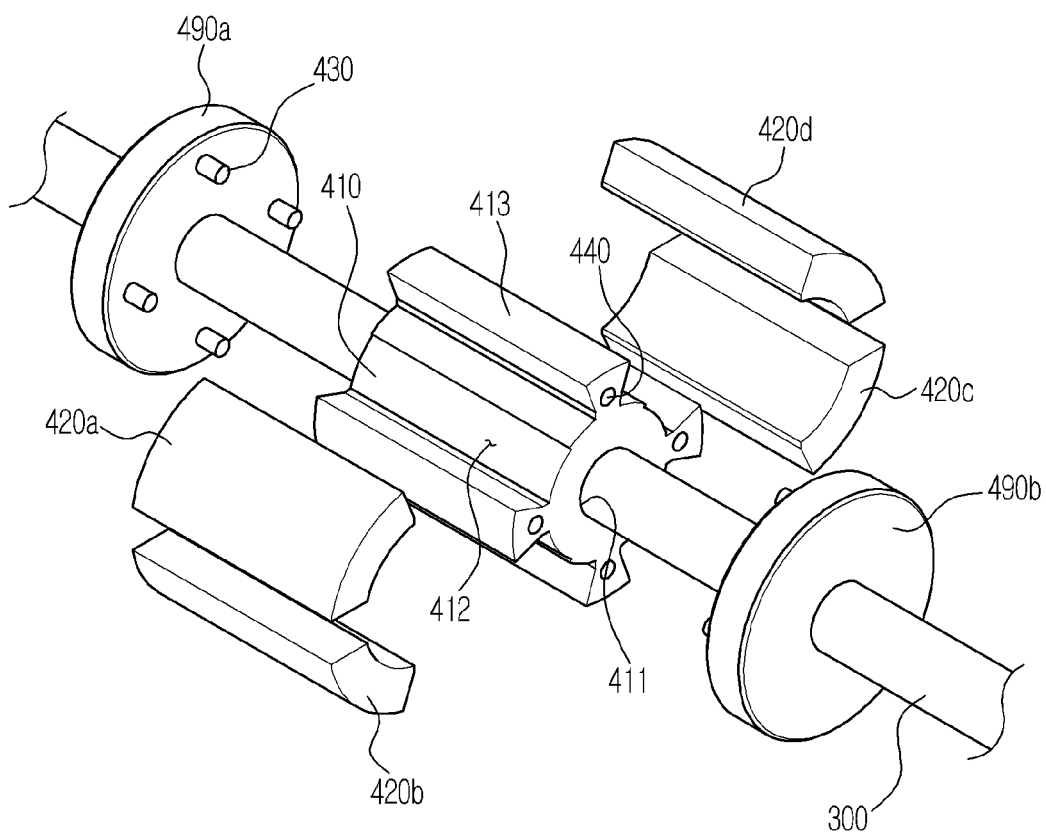
FIG. 3 is an exploded view illustrating a rotor of the BLDC motor in accordance with an embodiment of the present disclosure.

FIG. 3 is an exploded view illustrating a rotor of the BLDC motor in accordance with an embodiment of the present disclosure.

The rotor 400 may include the rotor core 410, the first permanent magnet 420a, the second permanent magnet 420b, the third permanent magnet 420c, the fourth permanent magnet 420d, the first balance 490a, and the second balance 490b.

The rotor core 410 may be provided with four permanent magnets 420 according to iron loss caused by driving at high speed and inverter switching frequency, for example. At four grooves 412 of the rotor core 410, four permanent magnets 420 may be disposed in a way that a permanent magnet is placed adjacent to another permanent magnet having opposite polarity to that of the permanent magnet. In a center part 411 of the rotor core 410, the shaft 300 may be inserted.

A protrusion structure of the rotor core 410 may protrude from the center of the rotation to obtain a reluctant torque when the rotor 400 is rotated. In particular, the protrusion structure may include a plurality of protrusions 413 protruding from the center of the rotation toward a circumferential direction of the rotor core 410. The protrusions 413 may protrude in the circumferential direction of the rotor core 410 to be formed in a shape of a fan having a large exterior angle.

The number of the protrusions 413 may be determined to correspond to the number of the grooves 412 of the rotor core 410, or may be determined to correspond to the number of the permanent magnets 420. For example, four protrusions 413 may protrude at an outer circumferential surface of the rotor core 410 with respect to the center of the rotation in the circumferential direction of the rotor core 410.

The first permanent magnet 420a, the second permanent magnet 420b, the third permanent magnet 420c, and the fourth permanent magnet 420d may be disposed on the grooves 412 formed among the four protrusions 413. When the first permanent magnet 420a, the second permanent magnet 420b, the third permanent magnet 420c, and the fourth permanent magnet 420d are coupled to the rotor core 410, a cross section of the rotor 400 may have two ring shapes being overlapped.

The permanent magnet 420 may be magnetized in a horizontal or vertical direction. However, for realizing sine wave air flux density, the magnetization direction of the permanent magnet 420 may be the horizontal direction.

The balance structure 490 is configured to maintain the balance in the rotor 400 that rotates. The balance structure 490 may maintain the balance of the rotor 400 which includes the balance structure 490 by machining the balance structure 490. The balance structure 490 may be formed in a shape of a circle having the same cross section size thereof as the cross section size of the rotor 400. The balance structure 490 may be divided into the first balance 490a disposed on the upper surface of the rotor 400 and the second balance 490b disposed on the lower surface of the rotor 400.

The protrusion 430 provided on the balance structure 490 may be inserted into holes 440 provided on the cross section of the rotor 400 so that the rotor 400 may be coupled to the balance structure 470 in a concavo-convex coupling manner. For example, four holes 440 may be provided on the rotor core 410. Four protrusions 430 may be formed on the balance structure 490 to correspond to the holes 440. The protrusion 430 provided on the balance structure 490 may be inserted into holes 440 of the rotor 400 so that the rotor 400 may be coupled to the balance structure 490.

Figure 4:
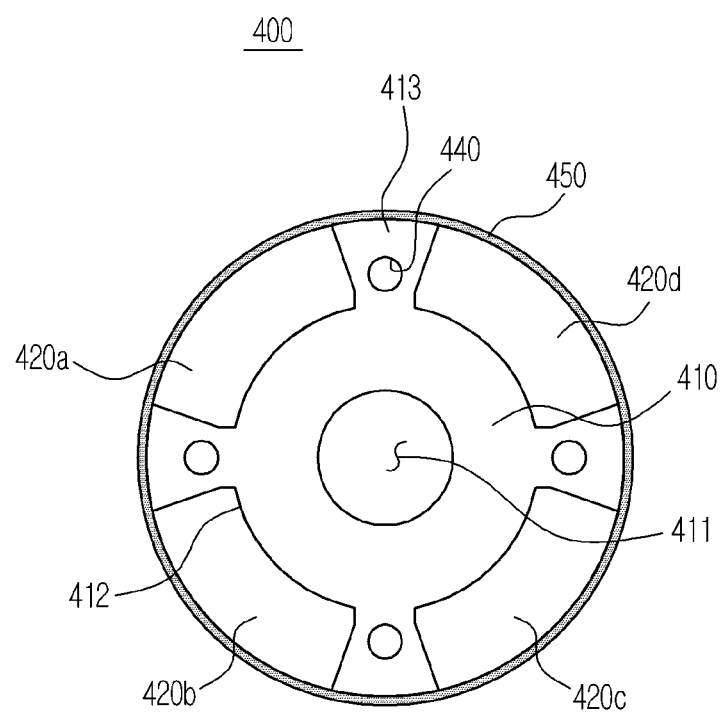
FIG. 4 is a cross-sectional view illustrating a rotor of the BLDC motor in accordance with an embodiment of the present disclosure.

FIG. 4 is a cross-sectional view illustrating a rotor of the BLDC motor in accordance with an embodiment of the present disclosure.

As illustrated in FIG. 4, an outer circumferential surface of the rotor 400 in which the rotor core 410 is coupled to the permanent magnet 420 may include a shatter proof structure 450. The shatter proof structure 450 may gather the permanent magnets 420 being coupled to the rotor core 410 together. The shatter proof structure 450 may be formed of structural steel, that is, stainless steel, heat-shrinkable tube, or high strength plastic, for example. Alternatively, the shatter proof structure 450 may be formed of various materials to prevent the permanent magnets 420 coupled to the rotor core 410 from being separated.

As illustrated in FIG. 4, the cross section of the rotor 400 provided with the rotor core 410, the permanent magnet 420, and the balance structure 490 may include the center part 411 in which the shaft 300 is installed. The cross section of the rotor 400 may have two ring shapes being overlapped.

Hereinafter, a stator in accordance with an embodiment of the present disclosure will be described with reference to FIG. 5.

Figure 5:
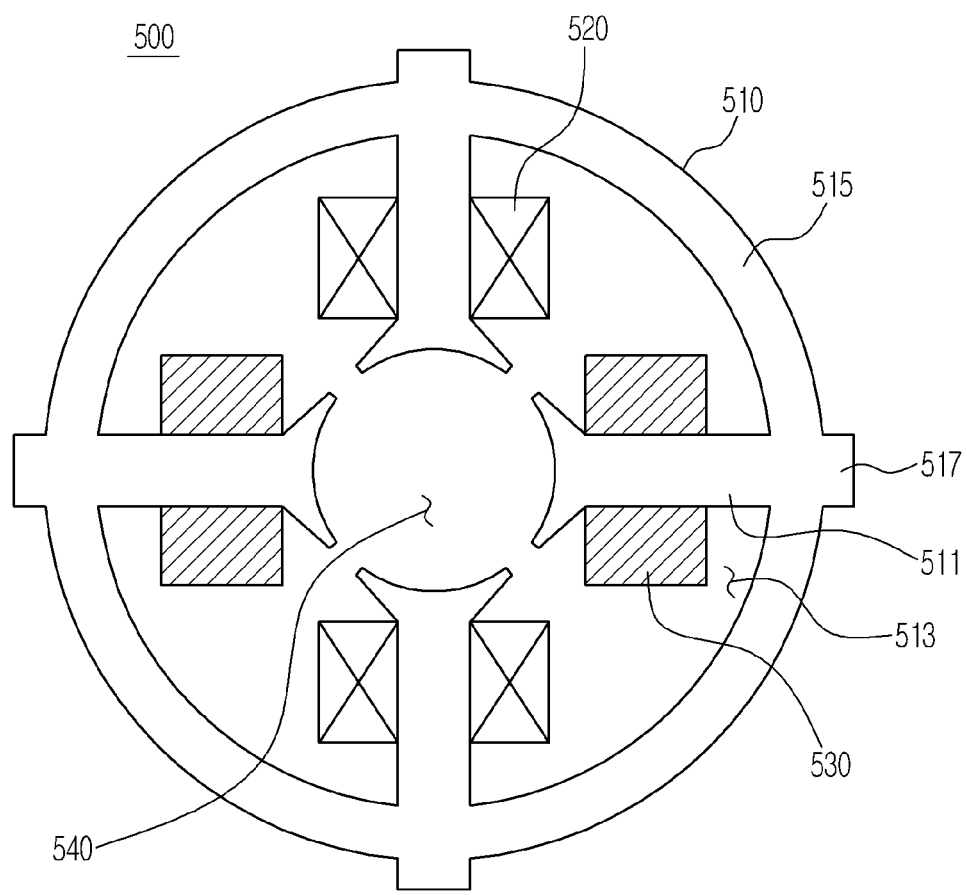
FIG. 5 is a cross-sectional view illustrating a stator of the BLDC motor in accordance with an embodiment of the present disclosure.

FIG. 5 is a cross-sectional view illustrating a stator of the BLDC motor in accordance with an embodiment of the present disclosure.

The stator 500 may include a stator core 510 forming a structure of the stator 500, a slot 513, and coils 520 and 530 wound around the stator core 510.

The stator core 510 may be configured to be a supporting frame to maintain a constant shape and may provide a space in which the coils 520 and 530 are installed.

The stator core 510 may include the teeth 511, a guide unit 515, and a fixing protrusion 517.

The teeth 511 may be disposed on the inside of the stator core 510 and may divide an inner space of the stator core 510 into a plurality of slots 513. The teeth 511 may provide a space in which a Direct Current (DC) coil 520 and an Alternating Current (AC) coil 530 are installed. The teeth 511 may be magnetized as a north pole or a south pole according to a magnetic field formed by power applied to the DC coil 520 or the AC coil 530.

The teeth 511 may be formed in a letter Y shape and may include a concave surface that is adjacent to the rotor 400 to efficiently generate gravitation and repulsive force with the permanent magnet 420 of the rotor 400. Alternatively, the teeth 511 may include various structures to provide a space in which the coils 520 and 530 are located, and to efficiently generate gravitation and repulsive force between the permanent magnet 420.

The guide unit 515 may form a structure of the stator core 510 and may maintain a constant shape of the stator core 510. The plurality of the teeth 511 may be coupled to the guide unit 515. The guide unit 515 may provide a flow path in which a magnetic field is formed so that when a tooth is magnetized by power, another tooth adjacent to the tooth is magnetized to have polarity opposite to polarity of the tooth.

The guide unit 515 may be formed in a shape of a cylinder. On the inside of the guide unit 515, the plurality of the teeth 511 may be disposed, and on the outside of the guide unit 515, the plurality of the fixing protrusions 517 may be disposed. Alternatively, the guide unit 515 may have various structures to maintain a constant shape of the state core 510 and to provide a space in which the fixing protrusion 517 is installed.

The fixing protrusion 517 may provide a fixation force so that the stator 500 is fixed to the second housing 26b without being rotated despite torque which is generated by gravitation and repulsive force between a first magnetic field formed by power applied to the coils 520 and 530 and a second magnetic field formed by the permanent magnet 420.

The fixing protrusion 517 may be formed on the outside of the wall of the guide unit 515 in parallel to the shaft 300 to be coupled to the hole of the second housing 26b in a concavo-convex coupling manner. Alternatively, the fixing protrusion 517 may include various shapes so that the stator 500 is fixed to the second housing 26b.

The stator core 510 provided with teeth 511, the guide unit 515, and the fixing protrusion 517 may be formed of a metal material, which easily generates a magnetic field, to be magnetized by power applied to the coils 520 and 530 and to be induced by adjacent teeth. Alternatively, the stator core 510 may be formed of various materials to easily be magnetized by the power source applied to the coils 520 and 530 and to be induced by adjacent teeth.

The coils 520 and 530 may be disposed on the teeth 511 of the stator core 510 and may generate a magnetic field by the power source being applied thereto. Therefore, the coils 520 and 530 may magnetize the teeth 511 corresponding thereto.

The coils 520 and 530 may be divided into the DC coil 520 and the AC coil 530. The DC coil 520 and the AC coil 530 may be alternately provided on the plurality of the teeth 511. For example, as shown in FIG. 5, when the DC coil 520 is disposed on one of the four teeth 511 at the twelve o'clock position, the AC coil 530 is disposed on the teeth at the three o'clock position, and when the DC coil 520 is disposed on the teeth at the six o'clock position, the AC coil 530 is disposed on the teeth at the nine o'clock position.

Due to the difference in the amount of current between the current applied to the DC coil 520 and the current applied to the AC coil 530, the cross-sectional area of the DC coil 520 may be different from the cross-sectional area of the AC coil 530. For example, when the current applied to the DC coil 520 may be 50 Apeak and the current applied to the AC coil 530 may be 12 Apeak, the DC coil 520 may have less resistance than the AC coil 530. Therefore, the cross-sectional area of the DC coil 520 may be larger than the cross-sectional area of the AC coil 530. That is, the DC coil 520 may be thicker than the AC coil 530.

The number of windings of the DC coil 520 may be different from the number of windings of the AC coil 530. In particular, when DC voltage applied to the DC coil 520 is different from AC voltage applied to the AC coil 530, the number of windings of the DC coil 520 is different from the number of windings of the AC coil 530 so that DC torque is equal to AC torque. Therefore, the proportion of the DC voltage to RMS (Root Mean Square) value of the AC voltage is inverse to the proportion of the number of windings in the DC coil 520 to the number of windings of the AC coil 530. The inverse proportion is expressed as Formula 1.

$$N_{DC}:N_{AC}=V_{RMS}:V_{DC} \quad \text{[Formula 1]}$$

Formula 1 shows the proportional relation among the number of windings of DC coils, the number of windings of AC coils, DC voltage, and RMS value of DC voltage. In Formula 1, the number of windings of DC coils, the number of windings of AC coils, the DC voltage, and the RMS value of the DC voltage may be expressed as $N_{DC}$, $N_{AC}$, $V_{RMS}$, and $V_{DC}$ respectively.

As shown in Formula 1, the proportion of the DC voltage to RMS value of the AC voltage may have an inverse relationship to the proportion of the number of windings of DC coil to the number of windings of AC coil.

$$N_{DC}:N_{AC} = \frac{320}{\sqrt{2}}:32 \quad \text{[Formula 2]}$$

Formula 2 shows an example of the ratio of Formula 1.

For example, when 320 Vpeak AC voltage is applied to the AC coil and 32 Vdc DC voltage is applied to the DC coil, the proportion of the number of windings of DC coil $N_{DC}$ to the number of windings of AC coil $N_{AC}$ may be expressed as Formula 2.

The direction of the windings of the DC coil 520 may be different from the direction of the windings of the AC coil 530. The directions of the windings of each of a plurality of the DC coils 520 may be the same as each other. The directions of the windings of each of a plurality of the AC coil 530 may be the same as each other.

For example, when DC power is applied to the DC coil 520, the one tooth 511 provided with the one DC coil 520 is magnetized as a north pole, the direction of the windings of the plurality of the DC coils 520 may be the same as each other so that another tooth 511 provided with another DC coil 520 is magnetized as a north pole. Alternatively, when DC power is applied to the DC coil 520, the tooth 511 provided with the DC coil 520 is magnetized as a north pole, the direction of the windings of the DC coil 520 may be opposite to the direction of the windings of the AC coil 530 so that the tooth provided with the AC coil 530 is magnetized as a south pole.

The technique of windings the coils 520 and 530 on the teeth 511 may be concentrated windings and distributed windings. Concentrated windings refers to windings having one slot per pole per phase and distributed windings refers to windings having more than one slot per pole per phase. Alternatively, the technique of winding the coils 520 and 530 on the teeth 511 may have various techniques to efficiently magnetize the teeth 511.

The coils 520 and 530 may be formed of copper, aluminum, and complex material combining copper and aluminum. Alternatively, the coils 520 and 530 may be formed of various materials to efficiently magnetize the teeth 511.

Hereinafter, the BLDC motor in which the rotor is coupled to the stator in accordance with an embodiment of the present disclosure will be described with reference to FIGS. 6 and 7.

Figure 6:
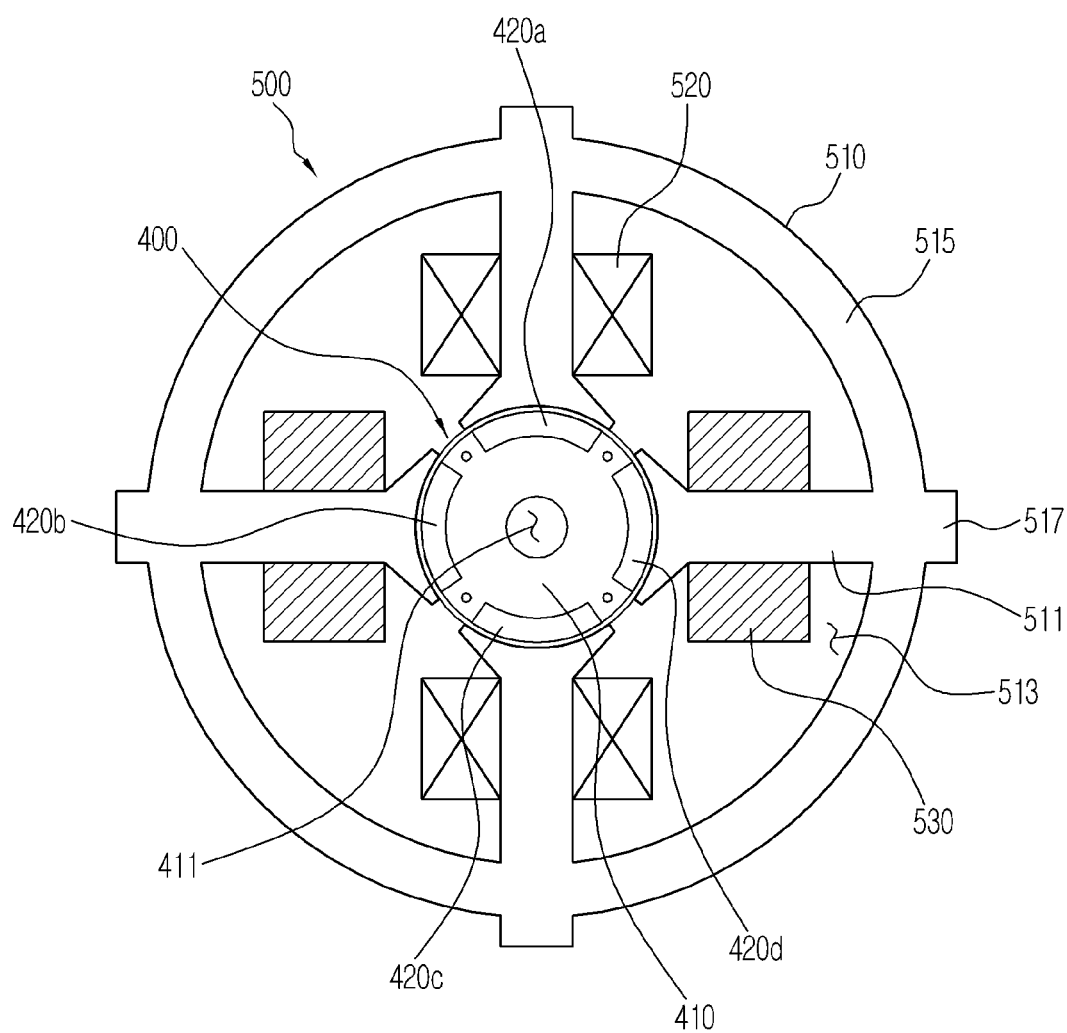
FIG. 6 is a cross-sectional view illustrating the BLDC motor in which the rotor is coupled to the stator in accordance with an embodiment of the present disclosure.
Figure 7:
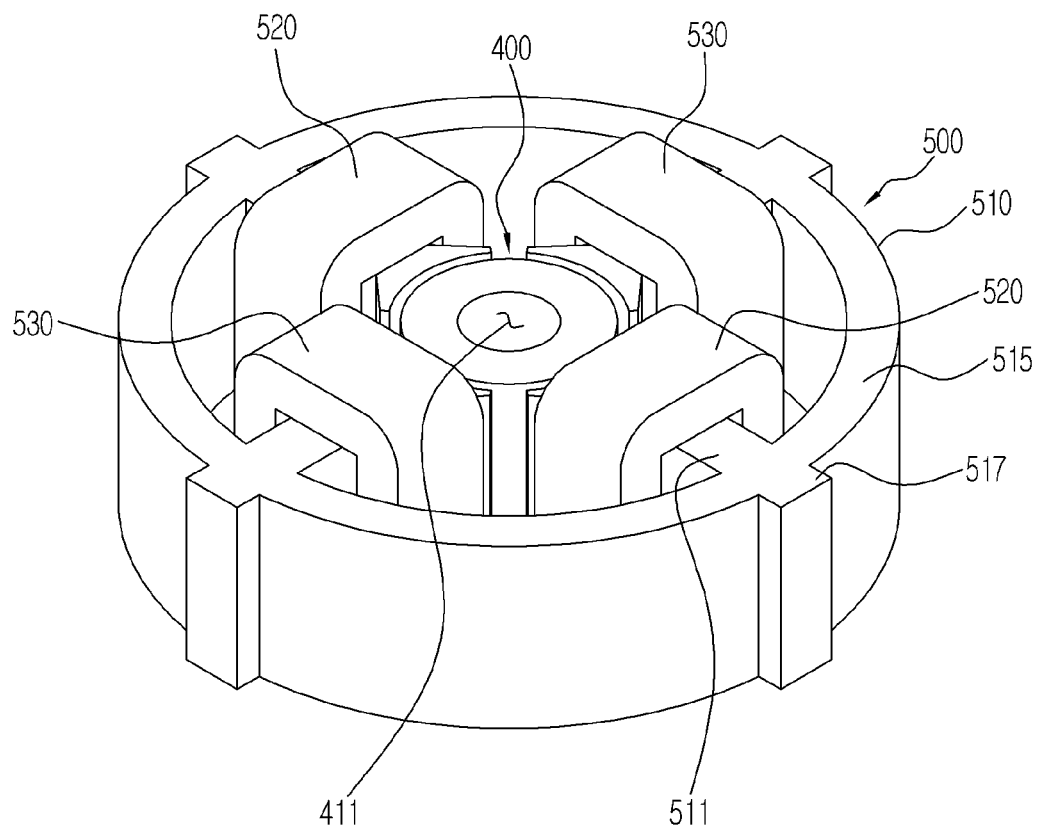
FIG. 7 is a perspective view illustrating the BLDC motor in which the rotor is coupled to the stator in accordance with an embodiment of the present disclosure.

FIG. 6 is a cross-sectional view illustrating the BLDC motor in which the rotor is coupled to the stator, and FIG. 7 is a perspective view illustrating the BLDC motor in which the rotor is coupled to the stator.

The rotor 400 may be disposed an inner side 540 of the stator 500, and the shaft 300 may be disposed on the center part 411 of the rotor 400. The rotor core 410 may be connected to the shaft 300, and the permanent magnet 420 may be coupled to the rotor core 410 in a surrounding manner. The scatter proof structure 450 may support the rotor core 410 and the permanent magnet 420 by being coupled to the outside of the permanent magnet 420 being coupled to the rotor core 410. The stator core 510 may be disposed on the outside while surrounding the rotor 400, and the coils 520 and 530 may be disposed on the teeth 511 of the stator core 510.

Hereinafter, teeth magnetized by DC coils and teeth induced to have opposite polarity in accordance with an embodiment of the present disclosure will be described with reference to FIGS. 8A and 8B.

Figure 8A:
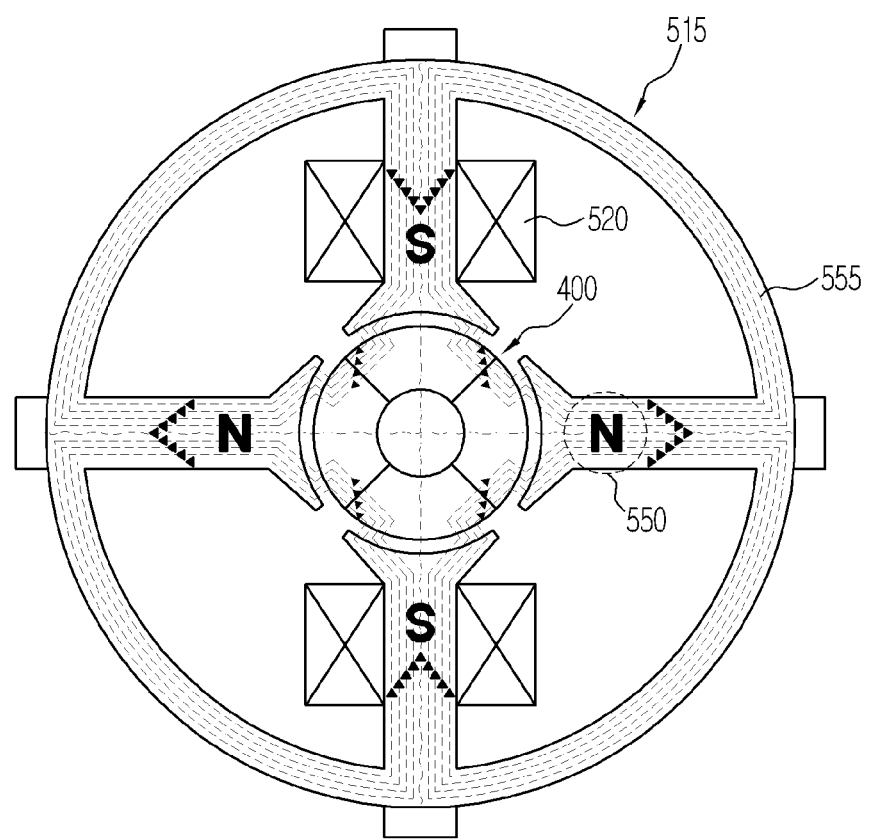
FIG. 8A is a conceptual diagram illustrating a north pole is induced on teeth provided with AC coils when DC power is applied to DC coils to form a south pole on teeth provided with DC coils in accordance with an embodiment of the present disclosure.
Figure 8B:
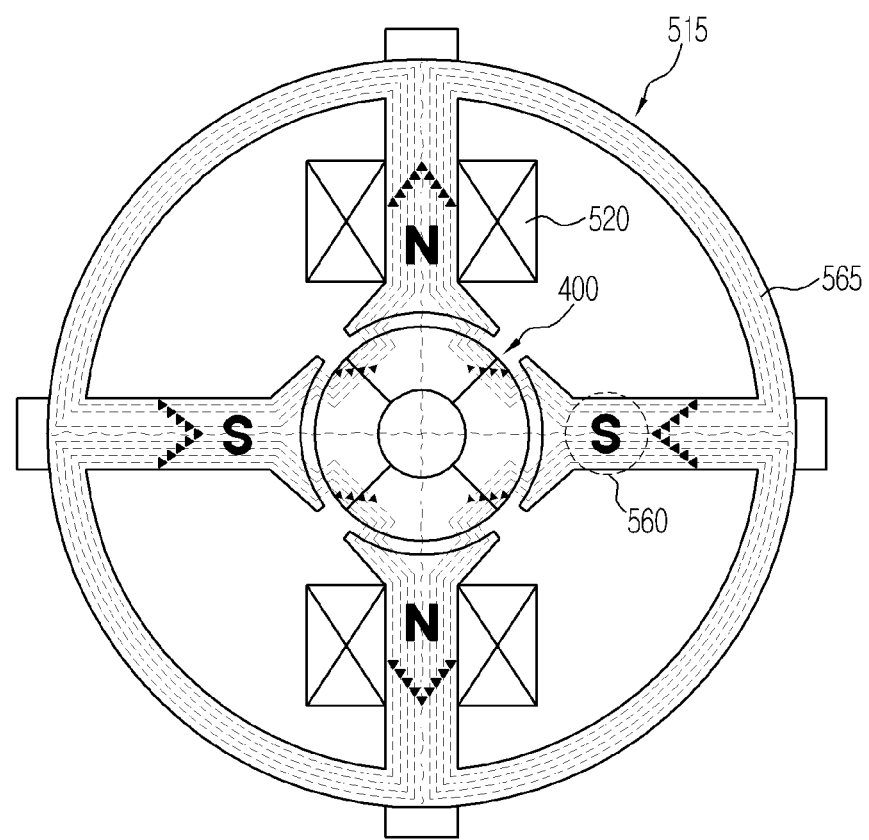
FIG. 8B is a conceptual diagram illustrating a south pole is induced on teeth provided with AC coils when DC power is applied to DC coils to form the north pole on teeth provided with DC coils in accordance with an embodiment of the present disclosure.

FIG. 8A is a conceptual diagram illustrating a north pole is induced on teeth provided with AC coils when DC power is applied to DC coils to form a south pole on teeth provided with DC coils, and FIG. 8B is a conceptual diagram illustrating a south pole is induced on teeth provided with AC coils when DC power is applied to DC coils to form the north pole on teeth provided with DC coils.

As illustrated in FIG. 8A, when DC power is applied to the DC coil 520, a tooth at the twelve o'clock position provided with the DC coil 520 and a tooth at the six o'clock position provided with the DC coil 520 may be magnetized as a south pole by Ampere's law. Magnetic flux 555 may flow along the guide unit 515 from teeth 550 provided with the AC coil 530 at the three o'clock position and at the nine o'clock position to teeth provided with the DC coil 520 at the twelve o'clock position and at the six o'clock position. Therefore, teeth 550, which are adjacent to teeth magnetized by DC power applied to the DC coil 520, provided with the AC coil 530 may be induced and magnetized as a north pole.

Alternatively, as illustrated in FIG. 8B, when DC power is applied to the DC coil 520, a tooth at the twelve o'clock position provided with the DC coil 520 and a tooth at the six o'clock position provided with the DC coil 520 may be magnetized as a north pole by Ampere's law. Magnetic flux 565 may flow along the guide unit 515 from teeth provided with the DC coil 520 at the twelve o'clock position and at the six o'clock position to a tooth 560 provided with the AC coil 530 at the three o'clock position and a tooth 560 at the nine o'clock position. Therefore, teeth 560, which are adjacent to teeth magnetized by DC power applied to the DC coil 520, provided with the AC coil 530 may be induced and magnetized as a south pole.

Hereinafter, teeth magnetized by AC coils and teeth induced to have opposite polarity in accordance with an embodiment of the present disclosure will be described with reference to FIGS. 9A and 9B.

Figure 9A:
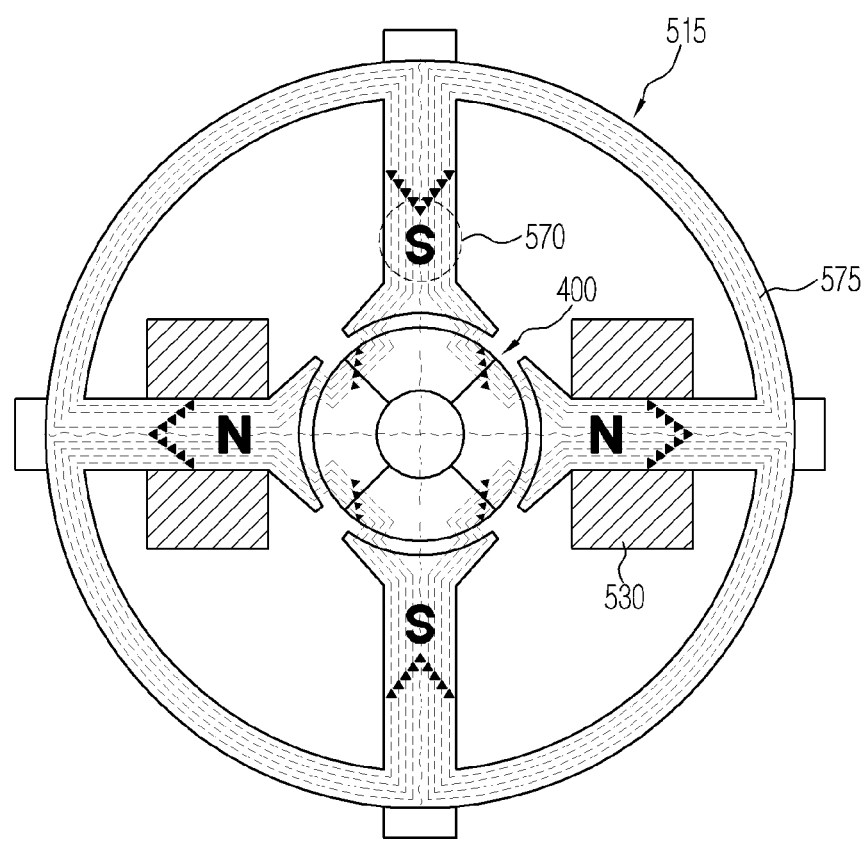
FIG. 9A is a conceptual diagram illustrating the north pole is induced on teeth provided with DC coils when AC power is applied to AC coils to form the south pole on teeth provided with AC coils in accordance with an embodiment of the present disclosure.
Figure 9B:
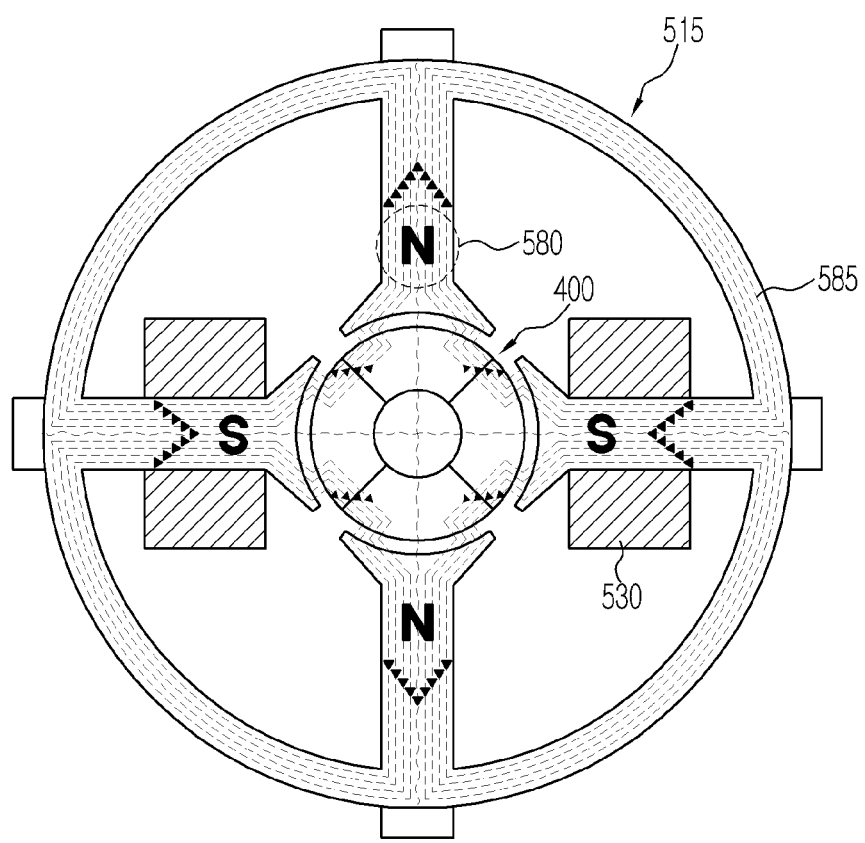
FIG. 9B is a conceptual diagram illustrating the south pole is induced on teeth provided with DC coils when AC power is applied to AC coils to form the north pole on teeth provided with AC coils in accordance with an embodiment of the present disclosure.

FIG. 9A is a conceptual diagram illustrating a south pole is induced on teeth provided with DC coils when AC power is applied to AC coils to form a north pole on teeth provided with AC coils, and FIG. 9B is a conceptual diagram illustrating a north pole is induced on teeth provided with DC coils when AC power is applied to AC coils to form a south pole on teeth provided with AC coils.

As illustrated in FIG. 9A, when AC power is applied to the AC coil 530, a tooth at the three o'clock position provided with the AC coil 530 and a tooth at the nine o'clock position provided with the DC coil 520 may be magnetized as a north pole by Ampere's law. Magnetic flux 575 may flow along the guide unit 515 from teeth provided with the AC coil 530 at the three o'clock position and at the nine o'clock position to teeth 570 provided with the DC coil 520 at the twelve o'clock position and at the six o'clock position. Therefore, teeth 570, which are adjacent to teeth magnetized by AC power applied to the AC coil 530, provided with the DC coil 520 may be induced and magnetized as a south pole.

Alternatively, as illustrated in FIG. 9B, when AC power is applied to the AC coil 530, a tooth at the three o'clock position provided with the AC coil 530 and a tooth at the nine o'clock position provided with the AC coil 530 may be magnetized as a south pole by Ampere's law. Magnetic flux 585 may flow along the guide unit 515 from teeth 580 provided with the DC coil 520 at the twelve o'clock position and at the six o'clock position to teeth provided with the AC coil 530 at the three o'clock position and at the nine o'clock position. Therefore, teeth 580, which are adjacent to teeth magnetized by AC power applied to the AC coil 530, provided with the DC coil 520 may be induced and magnetized as a north pole.

Hereinafter, a cleaner controlling DC operation and AC operation of the BLDC motor by two inverters in accordance with an embodiment of the present disclosure will be described with reference to FIG. 10.

Figure 10:
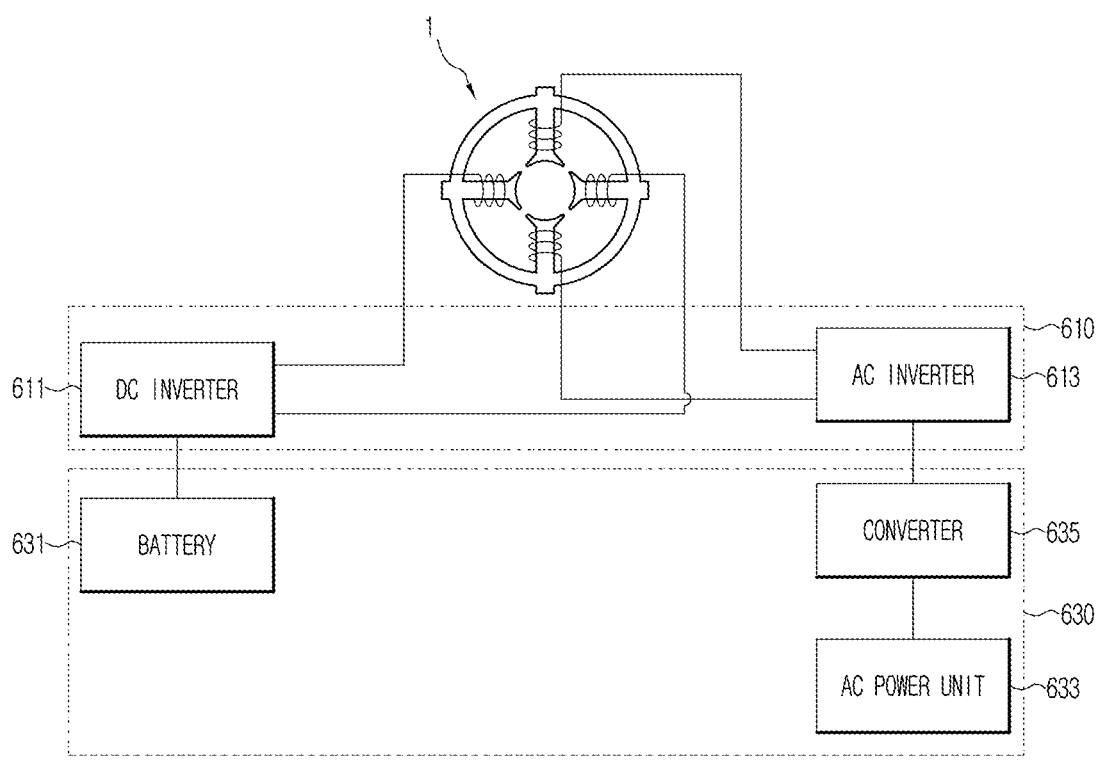
FIG. 10 is a conceptual diagram illustrating a cleaner using a DC inverter and an AC inverter separately in accordance with an embodiment of the present disclosure.

FIG. 10 is a conceptual diagram illustrating a cleaner using a DC inverter and an AC inverter separately.

A cleaner may include a power unit 630, an inverter 610, and a motor device 1.

The power unit 630 may be configured to supply power to the motor device 1 by receiving external power and by using a battery disposed inside of the cleaner. The power unit 630 may provide DC power and AC power.

In particular, the power unit 630 may include a battery 631 supplying DC power to the motor device 1, an AC power unit 633 receiving external power and supplying power to the cleaner, and a converter 635 to rectify AC power to DC power.

The battery 631 is an apparatus to convert chemical energy into electrical energy, and supplies DC power to the motor device. In particular, the battery 631 may convert energy, which is initially stored inside of the battery 631 or obtained by recharging, into electrical energy to supply DC power to the motor device without receiving external power.

Voltage level supplied from the battery 631 may be variable according to the battery capacity disposed inside of the cleaner. For example, the battery 631 may supply voltage at a level of 32.4 Vdc or 64.8 Vdc.

The AC power unit 633 is a power supply, and may receive power from outside the cleaner and deliver AC power to the inside of the cleaner. The AC power 633 may include a fuse to prevent surge voltage and overcurrent. For example, the AC power 633 may employ an adapter, and SMPS (Switching Mode Power Supply).

The converter 635 is an apparatus to convert from DC power or AC power to DC power. The converter 635 provided on the power unit 630 may be an AC-DC converter configured to convert AC power to DC power.

The inverter 610 may adjust the speed of the motor device 1 by converting from the power supplied by the power unit 630 to DC pulse. The inverter 610 may be divided into a first inverter 611 in which DC power supplied by the battery 631 is input, and a second inverter 613 in which DC power, which is rectified from AC power by the converter 635, is input.

In particular, the inverter 610 may output a DC pulse signal from DC power supplied by the battery 631 or DC power rectified from AC power of the power unit 633 by the converter 635. The inverter 610 may change a DC pulse period according to the rotation speed of the motor device 1. That is, the inverter 610 may adjust a DC pulse period to be short when the motor device is at high rotation speed, and may adjust a DC pulse period to be long when the motor device is at low rotation speed. The motor device 1 may have a maximum rotation speed of 75,000 rpm by the speed control of the inverter 610.

The inverter 611 and 613 supplying DC pulse by switching may employ PWM (Pulse Width-Modulated), VSI (Voltage Source Inverter), and CSI (Current Source Inverter), for example. Alternatively, the inverter 610 may employ various elements configured to output DC pulse to control the speed of the motor device 1 by DC power.

Hereinafter, a cleaner provided with the BLDC motor powered by DC power and AC power by a single inverter in accordance with an embodiment of the present disclosure will be described with reference to FIG. 11

Figure 11:
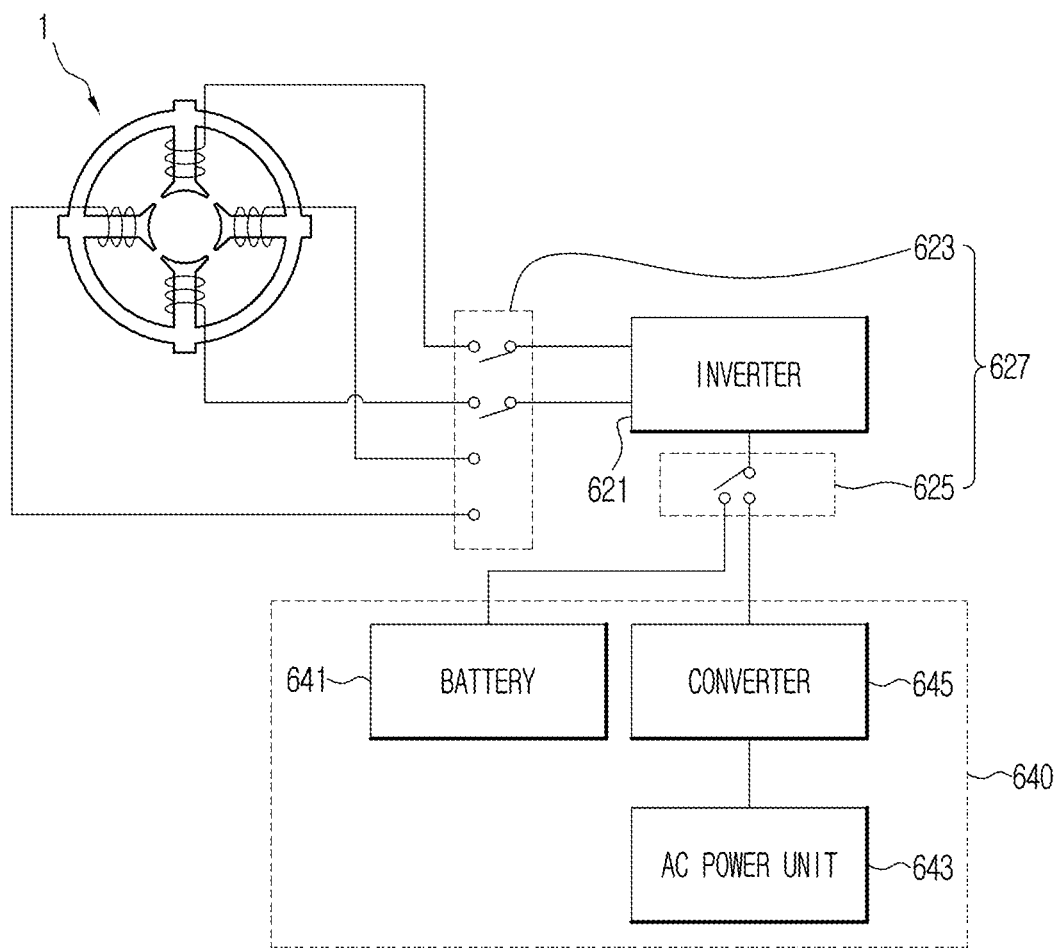
FIG. 11 is a conceptual diagram illustrating a cleaner using an inverter as a DC inverter and an AC inverter convertibly in accordance with an embodiment of the present disclosure.

FIG. 11 is a conceptual diagram illustrating a cleaner using an inverter as a DC inverter and an AC inverter convertibly.

A cleaner may include a power unit 640, an inverter 621, a switch 627, and a motor device 1.

The power unit 640 may include a battery 641 supplying DC power to the motor device 1, an AC power unit 643 receiving external power and supplying the cleaner, and a converter 645 to rectify AC power to DC power.

The battery 641, the AC power unit 643, and the converter 645 may be the same or different as the battery 631, the AC power unit 633, and the converter 635 in the cleaner provided with the BLDC motor powered by DC and AC by two inverters, as described above.

The inverter 621 may output a DC pulse from DC power supplied by the battery 641 or DC power rectified from AC power of the power unit 643 by the converter 645. The inverter 621 may change a DC pulse period according to the rotation speed of the motor device 1. In accordance with an embodiment of the present disclosure, a single inverter may be used. The type and control method of the inverter 621 may be the same or different as the inverters 611 and 613 in the cleaner provided with the BLDC motor powered by DC and AC by two inverters, as described above.

The switch 627 may include a first switch 623 and a second switch 625. The first switch 623 may be disposed between the inverter 621 and the motor device 1, and the second switch 625 may be disposed between the inverter 621 and the power unit 640. The first switch 623 and the second switch 625 may be switched due to input by users, or a residual capacity of battery, for example.

In particular, when the motor device 1 performs DC operation, the first switch 623 may electrically connect the DC coil 520 to the inverter 621 and the second switch 625 may electrically connect the battery 641 to the inverter 621. Alternatively, when the motor device 1 performs AC operation, the first switch 623 may electrically connect the AC coil 530 to the inverter 621 and the second switch 625 may electrically connect the converter 645 to the inverter 621.

The current and voltage used when the inverter 621, the first switch 623, and the second switch 625 perform DC operation may be different from when the inverter 621, the first switch 623, and the second switch 625 perform AC operation. Therefore, the inverter 621, the first switch 623, and the second switch 625 may employ elements having high withstanding voltage, and withstanding current. For example, when DC power is applied, voltage of 32 Vdc is applied to the inverter 621 and the switch 627, and current of 50 Apeak may run through inside of the inverter 621 and the switch 627. Alternatively, when AC power is applied, current of 12 Apeak may run through the inside of the inverter 621 and the switch 627. That is, voltage applied to the inverter 621 and the switch 627 when AC power is applied may be larger than when DC power is applied. Current applied to the inverter 621 and the switch 627 when DC power is applied may be larger than when AC power is applied. Therefore, the inverter 621, the first switch 623, and the second switch 625 may employ elements having more than a withstanding voltage of 320 Vpeak and more than a withstanding current of 50 Apeak.

As is apparent from the above description, according to an aspect of the present disclosure, it may be possible to realize the same suction force when DC power is applied and when AC power is applied, because a DC coil and an AC coil are provided on teeth in a separate manner.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:
1. A cleaner comprising:
   a Brushless Direct Current (BLDG) motor including:
   a rotor, and
   a stator including:
     a stator frame,
     a plurality of teeth that protrude inwardly in a radial direction of the stator frame toward a center of the stator,
     a Direct Current (DC) coil and an Alternating Current (AC) coil alternately installed on the plurality of teeth, and
     a guide unit configured to induce a second tooth adjacent to a first tooth among the plurality of teeth to have a polarity opposite to that of the first tooth, when the first tooth is magnetized by power applied to the DC coil or the AC coil; and
   a power unit configured to supply DC power and AC power to the DC coil and the AC coil, respectively.

2. The cleaner of claim 1, wherein the plurality of teeth is connected to the guide unit.

3. The cleaner of claim 1, wherein a cross-sectional area of the DC coil is larger than a cross-sectional area of the AC coil.

4. The cleaner of claim 1, wherein a number of windings of the DC coil and the AC coil is inversely proportional to a voltage applied to the DC coil and the AC coil, respectively.

5. The cleaner of claim 1, wherein a direction of windings of the DC coil is opposite to a direction of windings of the AC coil.

6. The cleaner of claim 1, further comprising:
   an inverter configured to control a rotation of the rotor in the BLDG motor by converting the DC power and the AC power to a DC pulse.

7. The cleaner of claim 6, wherein the power unit comprises:
   a battery supplying the DC power,
   an AC power unit supplying the AC power from an external power source, and
   a converter converting the AC power to the DC power.

8. The cleaner of claim 7, wherein more than two inverters are applied.

9. The cleaner of claim 7, further comprising:
   a first switch disposed between the inverter and the BLDC motor, and
   a second switch disposed between the inverter and the power unit.

10. The cleaner of claim 1, further comprising:
    a brush head to suction air to perform a cleaning operation;
    a body connected to the brush head and configured to house the BLDG motor which drives a fan configured to generate the suction force for the brush head.

11. The cleaner of claim 1, wherein the power unit includes a DC power source to supply the DC power and an AC power source to supply the AC power, and the cleaner further comprises:
    a converter to rectify the AC power supplied by the AC power source into DC power;
    an AC inverter connected to the AC coil, to receive the DC power rectified from the AC power by the converter, and to output a DC pulse signal to the AC coil; and
    a DC inverter connected to the DC coil, to receive the supply of DC power from the DC power source, and to output a DC pulse signal to the DC coil.

12. A Brushless Direct Current (BLDG) motor comprising:
    a shaft;
    a rotor connected to the shaft and provided with a plurality of permanent magnets; and
    a stator including;
      a stator frame,
      a plurality of teeth that protrude inwardly in a radial direction of the stator frame toward a center of the stator,
      at least one Direct Current (DC) coil and at least one Alternating Current (AC) coil alternately installed on the plurality of teeth, the at least one DC coil including a first DC coil installed on a first tooth among the plurality of teeth, and the at least one AC coil including a first AC coil installed on a second tooth among the plurality of teeth which is adjacent to the first tooth, and
      a guide unit configured to induce the second tooth to have a polarity opposite to that of the first tooth, when the first tooth is magnetized by DC power applied to the first DC coil, and configured to induce the first tooth to have a polarity opposite to that of the second tooth, when the second tooth is magnetized by AC power applied to the first AC coil.

13. The BLDC motor of claim 12, wherein the plurality of teeth are disposed to correspond to the plurality of permanent magnets and each of the plurality of teeth respectively protrude inwardly in the radial direction of the stator frame toward a respective permanent magnet of the plurality of permanent magnets.

14. The BLDC motor of claim 12, wherein the plurality of teeth is connected to the guide unit.

15. The BLDC motor of claim 12, wherein a cross-sectional area of the DC coil is larger than a cross-sectional area of the AC coil.

16. The BLDC motor of claim 12, wherein a number of windings of the DC coil and the AC coil is inversely proportional to a voltage applied to the DC coil and the AC coil, respectively.

17. The BLDC motor of claim 12, wherein a direction of windings of the DC coil is opposite to the direction of windings of the AC coil.

18. A brushless motor comprising:
   a rotor; and
   a stator comprising:
      a first tooth with a Direct Current (DC) coil installed thereon to receive power via a DC power supply,
      a second tooth with an Alternating Current (AC) coil installed thereon to receive power via an AC power supply, and
      a guide unit configured to induce a polarity on the second tooth that is opposite to a polarity of the first tooth established when power is applied to the DC coil and to induce a polarity on the first tooth that is opposite to a polarity of the second tooth established when power is applied to the AC coil.

* * * * *